Jan. 8, 1963     W. A. LEDWITH ETAL     3,071,925
INJECTOR HEAD FOR LIQUID ROCKET
Filed June 23, 1959
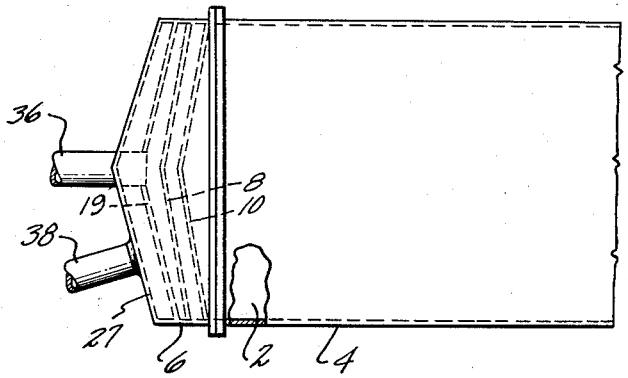
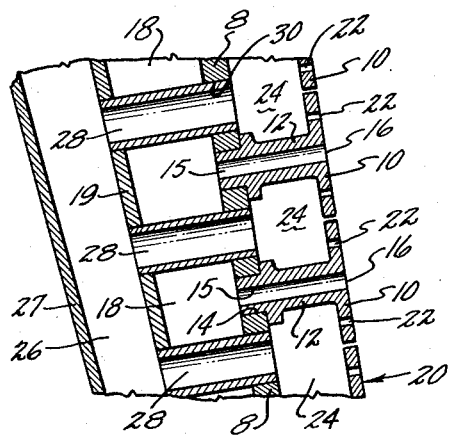
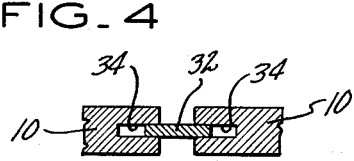
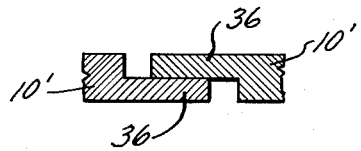
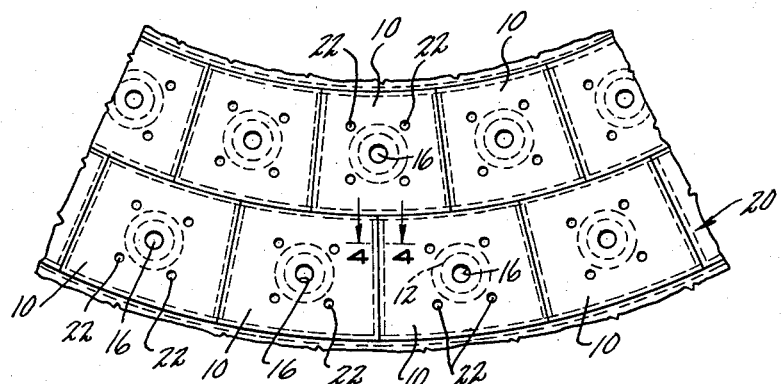
INVENTORS
WALTER A. LEDWITH
MARCUS C. BENEDICT
BY
ATTORNEY

3,071,925
INJECTOR HEAD FOR LIQUID ROCKET

Walter A. Ledwith and Marcus C. Benedict, Glastonbury, Conn., assignors to United Aircraft Corporation, East Hartford, Conn., a corporation of Delaware
Filed June 23, 1959, Ser. No. 822,377
5 Claims. (Cl. 60—39.46)

This invention relates to an injector for use in fluid propellant rockets.

In order to deliver sufficient quantities of propellants to the combustion chamber, it is common practice to provide a large number of inlet nozzles so arranged as to assure adequate mixing of the propellants. These nozzles are necessarily exposed to the radiant and convective heat of the combustion in the rocket chamber and accordingly operate at a relatively high temperature. On the other hand, the propellants supplied to these nozzles are generally cool or very cold so that the parts supporting the nozzles, that is the manifolds, are subjected to extreme thermal stresses. One feature of the invention is to arrange the injector elements in such a way as to minimize thermal stresses in the injector structure. Another feature is an injector head made up of a large number of small injector elements covering substantially the entire injector head area and arranged to permit a substantial thermal expansion between the several injector elements.

One feature of the invention is an injector head made up of small injector elements all of substantially the same shape and arranged to fit together to form a substantially continuous injector surface with all of these elements supported by a plate located in back of the elements. Another feature is the use of this supporting plate as a part of one of the propellant manifolds.

Other features and advantages will be apparent from the specification and claims, and from the accompanying drawing which illustrates an embodiment of the invention.

FIG. 1 is a side elevation of a rocket chamber, with parts broken away.

FIG. 2 is a fragmentary sectional view through the injector head.

FIG. 3 is an elevation view of the injector head.

FIG. 4 is a fragmentary sectional view of a modification, along a line comparable to line 4—4 of FIG. 3.

FIG. 5 is a view similar to FIG. 4 of another modification.

The invention is shown in connection with the rocket combustion chamber 2 having a substantially cylindrical side wall 4 and a closed end on the chamber. This head is constructed to form an injector head through which the propellant or propellants are delivered into the combustion chamber. The injector head includes a plate 8 the periphery of which is attached to the side wall 4 and which forms a basic structural element for the injector head. This plate 8 supports a plurality of similarly shaped injector elements 10 as by hollow posts 12 positioned in openings 14 in the plate 8 and supporting each element 10 in spaced relation to the plate. Each hollow post 12 may be integral with the element 10. The passage 15 in the hollow post terminates a central opening 16 in each injector element and one of the propellants, which may be either the oxidizer or the fuel, is delivered from a second propellant manifold or chamber 18 at the upstream side of the plate 8 through the hollow post and into the combustion chamber. The chamber 18 is located between plate 8 and a second plate 19 spaced therefrom.

Each element 10 is preferably substantially the same size as the remaining elements and the several elements are adapted to interfit to form a substantially continuous surface 20 forming the inner wall of the injector head. In the arrangement shown, the elements 10 are sector-shaped and arranged in rings concentric of the injector head. Thus the elements 10 in any one ring are all the same dimension and the injector elements in adjacent rings are similar in size and shape and could be almost the same dimensions.

Each injector element 10 has a plurality of smaller openings 22 arranged preferably in a ring around the central opening 16 and a propellant is discharged through these openings from the first propellant manifold or space 24 between the plate 8 and the injector elements 10. Propellant for this space may be provided from a third propellant manifold 26 on the side of plate 8 opposite to the elements. This third manifold may be formed by the plate 19 and a cap 27 and is connected by standpipes 28 to openings 30 in the plate 8. With this arrangement the propellant discharging through the standpipes 28 flows against the inner surfaces of the injector elements for cooling purposes and then flows through the openings or nozzles 22 into the combustion chamber.

The elements 10 are made of such a dimension that there will be clearance between adjacent elements when the device is cold since, as will be apparent, the elements 10 are exposed to the heat of the combustion chamber and will operate at a relatively high temperature while the plate 8 by reason of the propellants on both sides will operate at a much lower temperature and thermal stresses would be imposed if clearances were not provided. It is desirable to have the dimensions of the segments such that at normal operating temperatures the gap, as shown in FIG. 2, between adjacent segments will be substantially closed by relative thermal expansion to minimize the flow of propellant through these gaps. The flow or leakage through these gaps may be controlled or eliminated by providing a suitable seal between the elements, as shown in FIG. 4. In this arrangement, a strip 32 is positioned between adjacent injector elements and fits within grooves 34 in the edges of these elements.

As an alternative the adjacent elements 10' may have overlapping flanges 36, as shown in FIG. 5, so that leakage will be minimized and expansion will still be permitted. The propellants are supplied to spaces 18 and 26, respectively, as by the propellant inlets 36 and 38, FIG. 1.

It is to be understood that the invention is not limited to the specific embodiment herein illustrated and described, but may be used in other ways without departure from its spirit as defined by the following claims.

We claim:

1. An injector head for a rocket chamber, including a supporting plate, a plurality of injector elements mounted on said plate, each of said injector elements having first passage means for the discharge of a first propellant therethrough and second passage means for the discharge of a second propellant therethrough, and sealing means attached to and extending between said elements to form with said supporting plate and elements a chamber from which the second passage means extends.

2. An injector head for a rocket chamber, including a plurality of similarly shaped elements interfitting to form a substantially continuous surface portion and each having a central opening and a ring of openings surrounding said central opening, and a supporting plate on which the elements are mounted and which is substantially parallel to, spaced from and coacts with said continuous surface portion to form a first propellant manifold communicating with said ring of openings so that a first propellant may be passed through said first propellant manifold and hence said ring of openings, and conduit means positioned to conduct a second propellant to said central openings.

3. Apparatus according to claim 2 wherein said similarly shaped elements are sector-shaped and positioned in concentric rings and are normally spaced apart and in which each element is supported from the supporting plate by a hollow post through which said second propellant is provided to said central opening.

4. Apparatus according to claim 3 in which said conduit means comprises a second plate which is substantially parallel to, spaced from on the opposite side from said substantially continuous surface portion and coacts with said supporting plate to form a second propellant manifold communicating with the interior of said hollow posts so that said second propellant may be passed through said second manifold, and hence said hollow posts and central openings.

5. Apparatus according to claim 4 including a third plate which is substantially parallel to, spaced from and cooperates with said second plate to form a third propellant manifold on the opposite side of said second plate from said second propellant manifold, and a plurality of standpipes extending between said second plate and said supporting plate to join said first and third manifolds so that said first propellant can flow through said ring of openings after first passing through said third manifold, said standpipes and said first manifold.

References Cited in the file of this patent

UNITED STATES PATENTS

| | | |
|---|---|---|
| 2,405,785 | Goddard | Aug. 13, 1946 |
| 2,569,887 | Goddard | Oct. 2, 1951 |
| 2,733,570 | Macpherson | Feb. 7, 1956 |
| 2,754,656 | Munger | July 17, 1956 |
| 2,928,236 | Kircher et al. | Mar. 15, 1960 |
| 2,929,208 | Schultz | Mar. 22, 1960 |
| 2,940,259 | Mantler | June 14, 1960 |